UNITED STATES PATENT OFFICE.

CARL HOEPFNER, OF FRANKFORT-ON-THE-MAIN, GERMANY.

PROCESS OF OBTAINING LEAD OR OTHER METALS FROM ORES OR MATTES.

SPECIFICATION forming part of Letters Patent No. 735,098, dated August 4, 1903.

Application filed November 22, 1900. Serial No. 37,391. (No specimens.)

*To all whom it may concern:*

Be it known that I, CARL HOEPFNER, a subject of the Emperor of Germany, residing at Frankfort-on-the-Main, Germany, have invented certain new and useful Improvements in Processes of Recovering Lead or other Metals from Their Ores or Mattes; and I do hereby declare the following to be a full, clear, and exact description of the invention, such as will enable others skilled in the art to which it appertains to make and use the same.

My invention relates to the economical recovery of lead, silver, zinc, and copper from mixed ores thereof or from their mattes in such a manner as to form a continuous process.

I proceed as follows: The powdered ores are leached with any suitable solution containing chlorin in a reactive state, such as free chlorin, or preferably in the form of a perchlorid, such as the perchlorid of copper, ($CuCl_2$.) I preferably add, though not necessarily, to the perchlorid solution a solvent of the subchlorids, as a chlorid of a metal of the alkalies or alkaline earths, which is also a solvent of the chlorids of lead and of silver and other metals. From the solution so obtained and in which the reactive chlorin or perchlorid is converted into a subchlorid, as $CuCl_2$ to $Cu_2Cl_2$, the silver is precipitated by metallic copper, and this copper is preferably in contact with mercury, which facilitates the replacement of the silver in the solution by the metallic copper, while the silver precipitated forms an amalgam with the mercury. In using mercury there will be no objection if it contains another metal more electropositive than copper, as zinc or lead. Simultaneously or subsequently to the removal of the silver I eliminate, if necessary, any iron that may have been dissolved by any well-known reagent, such as the oxychlorid of copper, ($Cu_2Cl_2O$,) or by blowing air into the solution:

$$2Cu_2Cl_2 + 2FeCl_2 + 3O = 4CuCl_2 + Fe_2O_3.$$

Lead is now precipitated from the solution as a sulfite by suitable reagents, as by $SO_2$, or preferably by double decomposition with sulfites, such as those of sodium, zinc, and the compound ammonium sulfite:

$$PbCl_2 + Na_2SO_3 = PbSO_3 + 2NaCl.$$

$$PbCl_2 + ZnSO_3 = PbSO_3 + ZnCl_2.$$

These last precipitations should preferably be done when sure that there is no more free chlorin or any perchlorid present, and this is accomplished by using either an excess of ore in the first instance or by depending upon the copper used to precipitate the silver to accomplish the removal of perchlorid; otherwise any free chlorin or perchlorid would oxidize the sulfites to sulfates, which would not as completely precipitate the lead as sulfites do.

When the sulfite of zinc or its solution in common salt liquors is used for the precipitation of lead, which will be the more economical, the solution by reason of its being used over and over again by and by becomes enriched in zinc chlorid, adding to that which may have been dissolved out of the ore while dissolving the lead and silver.

When the solution contains from five per cent. to ten per cent. of zinc, the solution is freed from the more electronegative metals, such as copper, which can conveniently be done by metallic zinc or zinc oxid:

$$CuCl_2 + 2ZnO = ZnCl_2 + CuO.$$

This oxid of copper is redissolved by hydrochloric acid and returned into the cycle of operations for leaching fresh quantities of the powdered ore. The zinc-chlorid solution obtained after removal of the copper is then electrolyzed to form pure zinc and free chlorin, which latter, as well as the zinc-chlorid solution after partial removal of its zinc contents, is returned into the cycle of operations for leaching purposes.

The solution containing chlorid of zinc and cuprous chlorid may for the purpose of continued leaching of silver and lead be regenerated, either by the addition of free chlorin or substances like it, such as oxygen (air) and hydrochloric acid, or by making this solution the anode solution in an electrolytic apparatus with insoluble anodes. This regenerated solution is now returned into the cycle of operations for treating new quantities of ore and extracting new quantities of silver or lead.

The silver is easily recovered from the mercury by distillation.

In place of using copper to precipitate the silver I can conveniently use a suitable iodid, as the iodid of zinc, thus precipitating iodid of silver, which latter can conveniently be decomposed by metallic zinc to form iodid of zinc and metallic silver.

The sulfite of lead may be sold as such, but is preferably decomposed by hydrates of the alkalies or alkaline earths or their carbonates or by mixtures of the hydrates and carbonates, whereby lead is precipitated as oxid or carbonate, or both, to form a very pure precipitate of white lead or to be reduced to metallic lead by carbon:

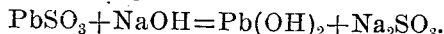
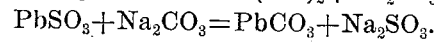

$$PbSO_3 + NaOH = Pb(OH)_2 + Na_2SO_3.$$
$$PbSO_3 + Na_2CO_3 = PbCO_3 + Na_2SO_3.$$

The alkali-metal-sulfite solution remaining can now be reconverted into caustic alkalies by means of caustic lime, $Ca(OH)_2$, according to well-known reactions.

The ore or matte residues resulting from this process when containing zinc or copper can without difficulty be used as zinc ores, as cupric chlorid dissolves but little of the zinc.

This process has the great advantage of allowing the operations to take place at normal or slightly-elevated temperatures and effecting a quick and complete separation of lead and silver from zinc. In the same way zinc ores and also copper ores or mattes can be freed from their contents of silver or lead, or both.

Throughout this specification I have used the term "metals of the alkalies," which term I wish it to be understood includes those analogous metals known as the "metals of the alkalies proper" and as the "metals of the alkaline earths" and also ammonium, which is so analogous in its reactions as to be classed in the first-mentioned groups.

Having thus described my invention, what I claim as new therein, and desire to secure by Letters Patent, is—

1. The process, which consists in leaching substances containing lead, with a solution containing chlorin in a reactive state and a solvent of the chlorid of lead, precipitating the lead, as a sulfite, thereby recovering the lead as an almost insoluble precipitate, substantially as described.

2. The process, which consists in leaching substances containing silver and lead with a solution containing chlorin in a reactive state and a solvent of the chlorids of silver and lead, precipitating the silver by a suitable reagent, treating the solution with a suitable sulfite thereby recovering the lead as a sulfite, substantially as described.

3. The process, which consists in leaching substances containing silver and lead with a solution containing chlorin in a reactive state and a solvent of the chlorids of silver and lead, precipitating the silver by a suitable reagent, precipitating the lead as a sulfite, thereby recovering the lead as an almost insoluble precipitate and returning the resulting solution to leach fresh quantities of ore, substantially as described.

4. The process, which consists in leaching compounds containing silver and lead with a solution containing a suitable chlorid and a solvent of said chlorid and of the chlorids of silver and lead, precipitating the silver by a suitable reagent, precipitating the lead as a sulfite, returning the resulting solution to leach fresh quantities of ore, and treating the lead sulfite with a suitable oxygen compound of a metal of the alkalies to form the corresponding compounds of lead, substantially as described.

5. The process, which consists in leaching compounds containing silver and lead with a solution containing reactive chlorin and a solvent of silver and lead chlorids, precipitating the silver by means of copper in contact with mercury to form an amalgam, precipitating the lead as a sulfite and returning the resulting solution to leach fresh quantities of ore, substantially as described.

6. The process, which consists in leaching compounds containing silver and lead with a solution containing a suitable chlorid, and a solvent of said chlorid and the chlorids of silver and lead, precipitating the silver by means of copper in contact with mercury containing a metal more electropositive than copper, precipitating lead as sulfite of lead, enriching the resulting chlorid solution in reactive chlorin and returning it to leach fresh quantities of ore, substantially as described.

7. The process, which consists in leaching compounds containing silver, lead and iron with a solution containing reactive chlorin and a solvent of the chlorids of silver, lead and iron, precipitating the silver by suitable means, removing the iron by a suitable precipitant and precipitating the lead as a sulfite, substantially as described.

8. The process, which consists in leaching compounds containing silver, lead and iron with a solution containing reactive chlorin and a solvent of the chlorids of said metals, precipitating the silver by means of copper in contact with mercury to form an amalgam, precipitating the iron by an oxygen compound, then the lead as a sulfite by means of a sulfite of a metal of the alkalies, thereby enriching the solution in alkali-metal chlorid, and returning the latter to leach fresh quantities of ore, substantially as described.

9. The process, which consists in leaching compounds containing silver, lead, iron and zinc with a solution containing reactive chlorin and a solvent of the chlorids of said metals, precipitating the silver by a suitable reagent, precipitating the lead as sulfite by means of a sulfite of zinc, suitably decomposing the resulting solution containing zinc chlorid to recover the zinc, and returning the chlorin to leach fresh quantities of ore, substantially as described.

10. The process, which consists in leaching compounds containing silver, lead, iron and zinc with a solution containing perchlorid of copper and a chlorid of a metal of the alkalies, precipitating the silver by a suitable reagent, precipitating the lead as a sulfite by means of a sulfite of zinc, and reconverting the resulting cuprous-chlorid solution into perchlorid of copper and returning the latter solution containing zinc chlorid to leach fresh quantities of ore, substantially as described.

11. The process, which consists in leaching compounds containing silver, lead, iron and zinc with a cupric-chlorid solution containing a chlorid of a metal of the alkalies, precipitating the silver by a suitable precipitant, precipitating the iron by means of oxychlorid of copper, removing the lead as a sulfite by means of a sulfite of zinc, reconverting the cuprous-chlorid solution to cupric chlorid, precipitating the copper by means of a zinc precipitant, decomposing the zinc chlorid in the resulting solution to obtain metallic zinc and chlorin, and returning the latter to leach fresh quantities of ore, substantially as described.

12. In the process described, the step, which consists in precipitating lead as a sulfite by means of a sulfite of zinc, substantially as described.

13. In the process described, the step, of removing lead from chlorid solutions, which consists in treating the same with monosulfite of zinc, thereby precipitating the lead as a sulfite, substantially as described.

14. The process, which consists in leaching compounds containing silver, lead, iron, zinc and copper with a solution containing reactive chlorin and a solvent of the chlorids of said metals, precipitating the silver by means of copper in contact with mercury, precipitating the lead as a sulfite, regenerating the resulting solution containing cuprous chlorid in chlorin by making such solution an anode solution in an electrolytic cell, and returning the same to leach fresh quantities of ore, substantially as described.

15. The process, which consists in leaching compounds containing lead, silver, iron and zinc, with a solution of cupric chlorid concentrated in sodium chlorid, removing the silver by means of copper in contact with mercury, precipitating the iron by means of oxychlorid of copper, removing the lead as a sulfite by means of the monosulfite of zinc, precipitating the copper from the resulting chlorid solution by means of zinc, decomposing the resulting zinc-chlorid solution to recover zinc, and returning the resulting solution and the free chlorin resulting from the decomposition of the zinc to leach fresh quantities of ore, substantially as described.

16. The process, which consists in leaching compounds containing silver, lead and zinc, with a solution containing reactive chlorin and a solvent of the chlorids of said metals, precipitating the silver by means of a more electropositive metal, removing the lead as a sulfite by means of the sulfite of a metal, substantially as described.

17. The process, which consists in leaching compounds containing silver, lead and iron with a solution containing chlorin in a reactive state and a solvent of the chlorids of said metals, precipitating the iron by means of oxygen, precipitating the lead as a sulfite by a suitable reagent, substantially as set forth.

18. The process, which consists in leaching compounds containing lead and iron with a solution of cupric chlorid containing a solvent of the chlorids of said metals, supplying oxygen to produce oxychlorid of copper whereby the iron is precipitated, and precipitating the lead as a sulfite by means of a sulfite of zinc, substantially as set forth.

In testimony that I claim the foregoing as my invention I have signed my name in presence of two subscribing witnesses.

CARL HOEPFNER.

Witnesses:
R. W. SOMMERS,
HENRY ORTH, Jr.